United States Patent [19]

deZarauz

[11] 4,112,210

[45] Sep. 5, 1978

[54] POLYMERIZATION PROCESS

[75] Inventor: Yves deZarauz, Le Cendre, France

[73] Assignee: Compagnie Generale des Etablissements Michelin, Clermont-Ferrand, France

[21] Appl. No.: 788,031

[22] Filed: Apr. 15, 1977

Related U.S. Application Data

[63] Continuation-in-part of Ser. No. 659,905, Feb. 20, 1976, abandoned.

[30] Foreign Application Priority Data

Feb. 27, 1975 [FR] France .................................. 75 06239

[51] Int. Cl.$^2$ ............................. C08F 4/46; C08F 4/56
[52] U.S. Cl. ..................................... 526/187; 526/185; 526/189; 526/190; 526/193; 526/196; 526/198
[58] Field of Search ................ 526/187, 177, 196, 198

[56] References Cited

U.S. PATENT DOCUMENTS

| 3,380,979 | 4/1968  | Chiang ............................. 526/187 |
| 3,429,861 | 2/1969  | Chiang et al. ................... 526/187 |
| 3,448,092 | 6/1969  | Chiang ............................. 526/187 |
| 3,526,604 | 9/1970  | Wadsworth ...................... 526/187 |
| 3,539,542 | 3/1968  | Nakatsuka et al. ............. 526/187 |
| 3,631,006 | 12/1971 | Hawkins .......................... 526/187 |

FOREIGN PATENT DOCUMENTS

27,662  11/1969  Japan ..................................... 526/187

*Primary Examiner*—William F. Hamrock
*Attorney, Agent, or Firm*—Brumbaugh, Graves, Donohue & Raymond

[57] ABSTRACT

Homopolymers of conjugated dienes and copolymers of conjugated dienes with other conjugated dienes or with vinyl aromatic compounds having an elastomeric character are prepared by use of a catalytic system formed of the reaction product of (a) an organometallic compound of a metal of Group IIIA of the Mendeleev periodic table of elements with (b) at least one electron-donor compound containing at least one hetero-atom.

10 Claims, 1 Drawing Figure

POLYMERIZATION PROCESS

Figure 1:
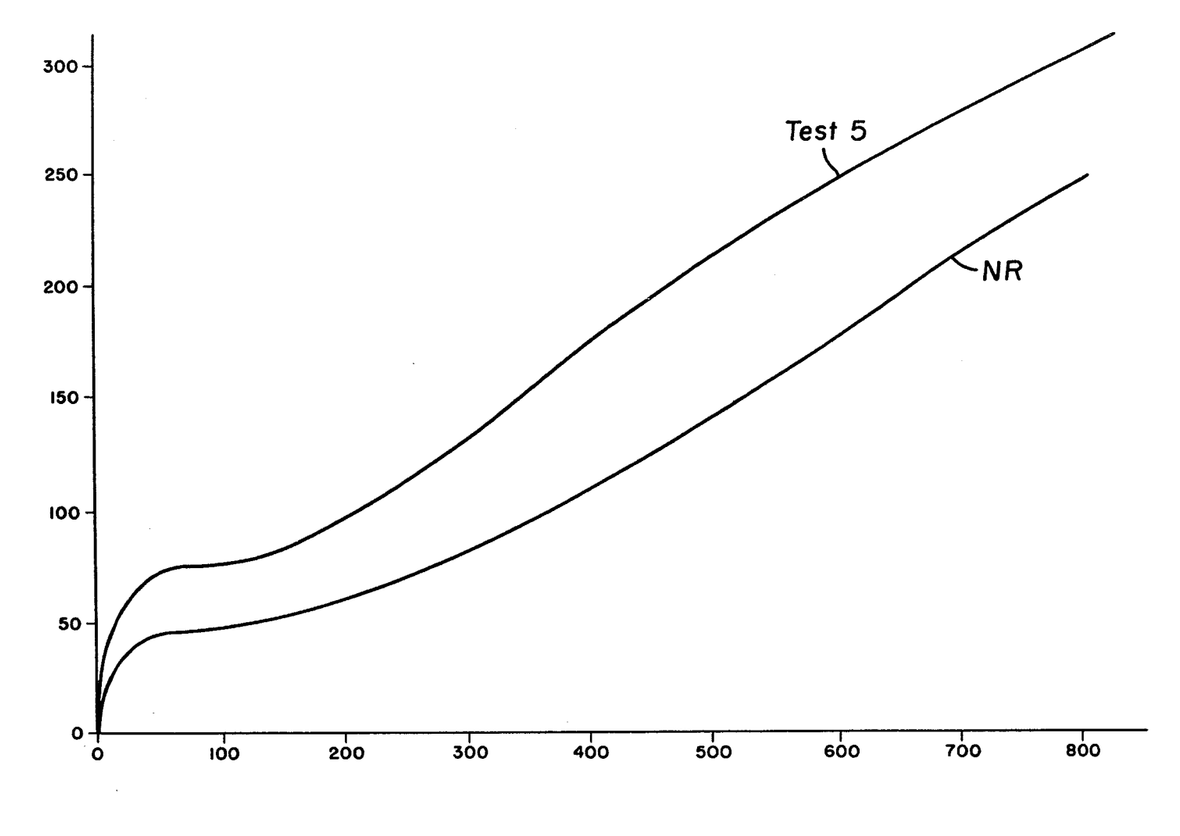

This application is a continuation-in-part application of U.S. application Serial No. 659,905, filed February 20, 1976, now abandoned.

The present invention relates to a process of producing homopolymers of conjugated dienes or copolymers of conjugated dienes with other conjugated dienes or with vinyl aromatic compounds.

From British Pat. No. 1,246,914, it is already known to prepare in solution homopolymers of conjugated dienes or copolymers of conjugated dienes with other conjugated dienes or with vinyl aromatic compounds by means of organometallic compounds of an alkaline earth metal of the formula $M^1 M^2 R^1 R^2 R^3 R^4$ in which $M^1$ represents calcium, barium, or strontium, $M^2$ represents zinc or cadmium, and $R^1$, $R^2$, $R^3$, $R^4$ represent a hydrocarbon radical. The polymers obtained have a very low intrinsic viscosity of between 0.24 and 0.62.

It is known (Chemical Abstracts, Vol. 78; 85 514 (1973) and RAPRA No. 23 738 L (1974)) to prepare in a hydrocarbon reaction medium homopolymers of conjugated dienes or copolymers of conjugated dienes with other conjugated dienes or with vinyl aromatic compounds by means of organometallic compounds of an alkaline earth metal and aluminum. However, the polymers obtained by this process, like the polymers mentioned above, have a very low intrinsic viscosity and, therefore, do not have elastomeric properties which are sufficient to permit their use as the principal component of mixtures serving for the manufacture of tires. Furthermore, such a process of manufacture cannot be applied industrially due to the very low homopolymerization or copolymerization reaction velocity.

Finally, it is widely known that the organometallic compounds of aluminum have an extremely low or even zero intrinsic catalytic activity and that they are not considered initiators for the homopolymerization or copolymerization of conjugated dienes.

The applicant has discovered a new process which makes it possible industrially to obtain within relatively short times and with good yield homopolymers of conjugated dienes or copolymers of conjugated dienes with other conjugated dienes or with vinyl aromatic compounds having an elasticity similar to rubber and which can be used in the manufacture of pneumatic tires.

Therefore, the object of the present invention is a process for the homopolymerization of conjugated dienes or the copolymerization of conjugated dienes with other conjugated dienes or with vinyl aromatic compounds to form elastomeric products which comprise reacting the monomers at a temperature between 50° C. and 120° C. in the presence of a catalytic system formed of the reaction product of (a) an organometallic compound of a metal of Group IIIA of the Mendeleev periodic table of elements having one of the following formulas:

Me$^1$ Me$^3$ R$^1$ R$^2$ R$^3$ R$^4$
Me$^2$(Me$^3$R$^1$R$^2$ R$^3$ R$^4$)$_2$
Me$^3$R$^1$ R$^2$ R$^3$
Me$^1$ O Me$^3$R$^1$ R$^2$ in which Me$^1$ represents an alkali metal, Me$^2$ represents an alkaline earth metal, Me$^3$ represents a metal of Group IIIA, R$^1$, R$^2$ and R$^3$ represent an alkyl or aralkyl radical and R$^4$ represents an alkyl or aralkyl radical or a radical XB in which X represents an oxygen, sulfur or nitrogen atom and B represents an alkyl or aralkyl radical, or a radical Me$^3$(R$^5$R$^6$) in which R$^5$ and R$^6$ represent an alkyl or aralkyl radical; with (b) at least one electron-donor compound containing at least one hetero-atom selected from the group consisting of aprotic polar compounds, protic polar compounds and compounds formed of the reaction product of protic polar compounds with an alkali metal or with an alkaline earth metal.

The applicant has surprisingly found that the reaction product of compounds which, taken alone, are not initiators of the homopolymerization or of the copolymerization of conjugated dienes with other conjugated dienes or with vinyl aromatic compounds or which have only an extremely low intrinsic initiating activity constitutes an initiating catalytic system for the homopolymerization of conjugated dienes or the copolymerization of conjugated dienes with other conjugated dienes or with vinyl aromatic compounds which can be used industrially as elastomers.

The organometallic compounds of a metal of Group IIIA which are particularly suitable as a component of the catalytic system are those in which the alkali metal is lithium, sodium, or potassium, those in which the alkaline earth metal is magnesium, calcium, strontium or barium, and those in which the metal of Group IIIA is boron, aluminum, gallium, indium or thallium. By way of example, the following compounds can be mentioned:

Al(CH$_3$)$_3$, Al(C$_2$H$_5$)$_3$, Al(i-C$_4$H$_9$)$_3$, Li [Al(C$_2$H$_5$)$_4$], Na[Al (C$_2$H$_5$)$_4$], K[Al(C$_2$H$_5$)$_4$], Li [Al(C$_2$H$_5$)$_3$O C$_2$H$_5$], Li [Al(C$_2$H$_5$)$_3$O Al(C$_2$H$_5$)$_2$], Mg [Al(C$_2$H$_5$)$_4$]$_2$, C$_2$H$_5$Mg Al(C$_2$H$_5$)$_4$, Ca [Al(C$_2$H$_5$)$_4$]$_2$, Sr [Al(C$_2$H$_5$)$_4$]$_2$, Ba [Al(C$_2$H$_5$)$_4$]$_2$, Ba [Al(C$_2$H$_5$)$_3$O C$_2$H$_5$]$_2$, Ba [Al-(iso C$_4$H$_9$)$_4$]$_2$, Li O Al(C$_2$H$_5$)$_2$, Na O Al(C$_2$H$_5$)$_2$, B (CH$_3$)$_3$, B (C$_2$H$_5$)$_3$, Li B(C$_2$H$_5$)$_4$, Li B(C$_2$H$_5$)$_3$C$_4$H$_9$, Ga(C$_2$H$_5$)$_3$, In(C$_2$H$_5$)$_3$, Tl (C$_2$H$_5$)$_3$.

By way of examples of aprotic polar compounds, there are especially suitable the ethers and particularly the cyclic ethers, such as tetrahydrofuran and dioxane, as well as the corresponding thioethers, such as thiodiisobutyl; the tertiary amines, such as N,N,N',N'-tetramethylethylenediamine (TMED); the aromatic amines and in particular the pyridine derivatives, such as 4-methylpyridine, and the corresponding oxides; phosphorous compounds, such as the phosphines and their oxides, the phosphites, the phosphoramides and in particular hexamethylphosphorotriamide (HMPT); the ketones and particularly acetone; the nitriles and particularly acetonitrile; the aldehydes; the esters; the amides; the nitro-aliphatic or aromatic compounds; the sulfoxides and particularly dimethyl sulfoxide; the sulfones; and the sulfites.

As protic polar compounds there are suitable in particular water; the alcohols and particularly methanol; the primary or secondary amines; the phenols; and the thiols.

As compounds formed of the reaction product of protic polar compounds with an alkali metal or with an alkaline earth metal there are particularly suited the alcoholates and phenates of alkali metals or alkaline earth metals, such as lithium isopropylate, barium nonylphenate and sodium or potassium tert-amylate; the alkali metal or alkaline earth metal mercapto and thiophenates; as well as the ether-alcoholates and amine-alcoholates of alkali metals or alkaline earth metals, such as the lithium alcoholate of ethyl diglycol and lithium N,N-diethylamino-2-ethanolate.

The organometalic compound of a metal of Group IIIA and the electron-donor compound or compounds can be introduced into the reaction medium either individually in any order or preformed. In accordance with the second variant, the catalytic system is "preformed" by mixing the various components and then bringing the mixture to a temperature of between 20° C. and 100° C. for 5 to 60 minutes.

The two components of the catalytic system can be used in variable proportions but it is preferable to use them in proportions such that the molar ratio of the electron donor compound or compounds to the organometallic compound of a metal of Group IIIA is between 0.01:1 and 100:1. For a given concentration of organometalic compound of a metal of Group IIIA, a modification of the value of the molar ratio may modify both the intrinsic viscosity and the microstructure of the polymer formed as well as the polymerization and copolymerization reaction velocity. Among the organometallic compounds of a metal of Group IIIA organo-aluminum compounds are preferred due both to their advantageous method of manufacture and to their extensive availability on the market.

In the case of catalytic systems formed of an organometallic compound of aluminum having the formula $Me^2[Al\ R^1R^2R^3R^4]_2$, such as defined above, and one or more polar compounds of the class of aprotic polar compounds, for a given concentration of an aluminum organometallic compound when the value of the molar ratio of the aprotic polar compound or compounds to the organo-aluminum compound increases, the reaction velocity and the intrinsic viscosity of the polymer formed increase without the micro-structure of the polymer being changed. This is all the more surprising, since the addition of polar compounds to organo-lithium initiators leads to a system which does not change the intrinsic viscosity of the polymer but changes the microstructure thereof.

In the case of catalytic systems formed of an organometallic compound of aluminum having the formula $Me^2(Me^3R^1\ R^2\ R^3\ R^4)_2$, as defined previously, and a polar compound selected from among those having one of the formulas $R\ (O\ CH_2CH_2)_n\ O\ Me^1$, or $(R)_2N\ CH_2CH_2O\ Me^1$ in which $Me^1$ represents an alkali metal, R represents an alkyl radical and $n$ is a whole number, polymers and copolymers having a very high content of trans-1,4 linkages (up to 92%) and a very low content of 1,2 or 3,4 linkages, that is to say less than 4%, and which retain an elastomeric character can be obtained. The copolymers of butadiene and styrene (SBR) thus obtained have a resistance to elongation similar to that of natural rubber when in crude state (nonvulcanized) and when filled in accordance with the customary formulations used for the manufacture of automobile tires.

The homopolymerization or copolymerization reaction is carried out either in an inert hydrocarbon solvent which may, for instance, be an aliphatic or alicyclic hydrocarbon, such as pentane, hexane, heptane, iso-octane, cyclohexane, or an aromatic hydrocarbon, such as benzene, toluene, xylene, or in bulk polymerization.

The reaction is generally carried out at a temperature of between 50° C. and 120° C. and preferably between 80° C. and 100° C., under a pressure which corresponds to the vapor pressure of the reagents. The process of the invention can be carried out batch-wise or continuously.

The process not only makes it possible to obtain high yields of macromolecular compounds per unit of weight of the catalytic system but it also makes it possible to regulate to the desired extent the molecular weight of the homopolymers or copolymers prepared.

The process furthermore makes it possible to obtain homopolymers or copolymers which during the reaction can give rise to grafting reactions with all reagents capable of reacting with living polymers.

As representative examples of conjugated dienes which are suitable for the homopolymerization and copolymerization mention may be made of 1,3-butadiene, isoprene, 2,3-dimethyl-1,3-butadiene, 1,3-pentadiene and 2-ethyl butadiene.

As representative examples of suitable vinyl aromatic compounds mention may be made of styrene; ortho-, meta-, and para-methyl styrene; di- and polymethylstyrene; para-tert-butylstyrene; the vinyl naphthalenes; the methoxystyrenes; the halostyrenes; and divinylbenzene.

The products obtained by the process of preparation employing the catalytic system in accordance with the invention furthermore have a broad molecular weight distribution and a high intrinsic viscosity, that is to say sufficient so that the products can be used as the principal component of mixes serving for the manufacture of pneumatic tires, and a microstructure which may vary extremely. As a matter of fact, the content of trans-1,4 linkages may be between 20% and 90% and the content of 1,2-linkages may be between 1% and 60%. Furthermore, these products are very well suited for mechanical working on tools.

The invention will be fully understood from the following examples which, by way of illustration, describe special manners for carrying it out. In all the examples the intrinsic viscosities were determined at 25° C. In solution of 1 g. per liter in toluene, the concentrations of catalysts are expressed in micromols per 100 g. of monomers and the homopolymerization or copolymerization reactions were stopped when the rate of conversion reached 80% (except in Examples 19, 23 and 27), by addition of methanol in suitable quantities (1%). The percentages of trans-1,4 linkages and 1,2 linkages are expressed with reference to the polybutadiene portion while the percentage of styrene is expressed with reference to the total amount of polymer obtained.

EXAMPLE 1

Two liters of heptane were introduced as solvent into a reactor under the pressure of rectified nitrogen whereupon 205 g. of butadiene and 69 g. of styrene were introduced and the temperature was increased to 80° C. The catalytic system formed of Ba $[Al(C_2H_5)_4]_2$ and of tetrahydrofuran (THF) in variable quantities was then introduced in succession in four tests. When the rate of conversion was reached, the reaction was stopped and the copolymer recovered.

The results of the four tests are set forth in the following table:

TABLE I

| Test No. | Catalytic System Ba[Al(C$_2$H$_5$)$_4$]$_2$ | THF | Reaction Time | Intrinsic Viscosity | SBR Copolymers Steric Configuration |||
|---|---|---|---|---|---|---|---|
| | | | | | % tr. 1,4 | % 1,2 | % Sty. Incorp. |
| T | 1820 | 0 | 40 hr. | 0.8 | 85 | 3 | 15 |
| 1 | 1100 | 1100 | 8 hr. 30 min. | 1.6 | 81 | 3 | 15 |
| 2 | 1100 | 2200 | 6 hr. | 2.1 | 80 | 3 | 16 |

TABLE I-continued

| Catalytic System | | | | SBR Copolymers | | |
|---|---|---|---|---|---|---|
| Test No. | $Ba[Al(C_2H_5)_4]_2$ | THF | Reaction Time | Intrinsic Viscosity | Steric Configuration | |
| 3 | 1100 | 4400 | 4 hr. | 2.45 | 80 | 4 16 |

It was found that the reaction time is 5 to 10 times less (Test T versus Tests 1–3) and that when the value of the molar ratio of THF to $Ba[Al(C_2H_5)_4]_2$ increases, the reaction velocity and the intrinsic viscosity of the SBR copolymer increase while the microstructure of the SBR copolymer remains unchanged.

EXAMPLE 2

Four tests were carried out repeating the procedure of Example 1 with different catalytic systems. The results are set forth in Table II below:

TABLE II

| Catalytic System | | | | SBR Copolymers | | | |
|---|---|---|---|---|---|---|---|
| Test No. | Organometallic Compound | | THF | Reaction Time | Intrinsic Viscosity | Steric Configuration | |
| | | | | | | % tr. 1,4 | % 1,2 % Sty. Incorp. |
| 1 | $Ca[Al(C_2H_5)_4]_2$ | 640 | 1920 | 3 hr. | 1.3 | 73 | 7 10 |
| 2 | $Sr[Al(C_2H_5)_4]_2$ | 1100 | 3500 | 2 hr. 20 min. | 1.4 | 73 | 7 12 |
| 3 | $Ba[Al(C_2H_5)_4]_2$ | 1100 | 3300 | 4 hr. 30 min. | 2.25 | 80 | 4 16 |
| 4 | $Ba[Al(isoC_4H_9)_4]_2$ | 860 | 2580 | 2 hr. | 1 | 74 | 5 15 |

EXAMPLE 3

Three tests were carried out. Into a 250 ml. Steinie bottle under pressure of rectified nitrogen there were introduced 100 ml. of heptane as solvent and 13.6 g. butadiene. The catalytic system formed of $Ba[Al(C_2H_5)_4]_2$ and methanol was then introduced. The bottle was placed in a thermostatically controlled tank at 80° C. in which it was agitated.

At the end of the reaction, the polybutadiene was recovered in ordinary manner. The results are set forth in Table III below.

TABLE III

| Catalytic System | | | | Polybutadiene | |
|---|---|---|---|---|---|
| Test No. | $Ba[Al(C_2H_5)_4]_2$ | Methanol | Reaction Time | Intrinsic Viscosity | Steric Configuration |
| | | | | | % tr. 1,4 % 1,2 |
| 1 | 1100 | 74 | 7 hr. | 1.64 | 86 3 |
| 2 | 1100 | 222 | 6 hr. | 1.59 | 84 3 |
| 3 | 1100 | 444 | 5 hr. | 1.50 | 81 3 |

EXAMPLE 4

A test was carried out repeating the procedure of Example 3 and using similar conditions except that a catalytic system formed of $Ba[Al(C_2H_5)_4]_2$ and water was employed. The results are set forth in Table IV below.

TABLE IV

| Catalytic System | | | Polybutadiene | |
|---|---|---|---|---|
| Test No. | $Ba[Al(C_2H_5)_4]_2$ | $H_2O$ | Reaction Time | Intrinsic Viscosity | Steric Configuration |
| | | | | | % tr. 1,4 % 1,2 |
| 1 | 1100 | 440 | 17 hr. | 1.55 | 87 2 |

EXAMPLE 5

Three tests were conducted, the reaction being carried out in a reactor under pressure of rectified nitrogen. Two liters of heptane were introduced as solvent followed by 191 g. of butadiene and 82 g. of styrene. The temperature was increased to 80° C. and the catalytic system formed of $Ba[Al(C_2H_5)_4]_2$ and of lithium isopropylate was added. At the end of the reaction, the copolymer was recovered in a customary manner. The results are set forth in Table V below.

TABLE V

| Catalytic System | | | SBR Copolymers | | |
|---|---|---|---|---|---|
| Test No. | $Ba[Al(C_2H_5)_4]_2$ | Lithium Isopropylate | Reaction Time | Intrinsic Viscosity | Steric Configuration |
| | | | | | % tr. 1,4 % 1,2 % Sty. Incorp. |
| 1 | 340 | 2400 | 4 hr. | 3 | 83 4 21 |
| 2 | 380 | 2600 | 4 hr. | 2.6 | 83 3 20 |
| 3 | 550 | 1380 | 4 hr. | 1.7 | 81 4 23 |

EXAMPLE 6

Two tests were carried out. Two liters of solvent (heptane) followed by 205 g. of butadiene and 69 g. of styrene were introduced into a reactor under the pressure of rectified nitrogen. The temperature was brought to 80° C. and then the components of the catalytic system, i.e., N,N,N',N'-tetramethylethylenediamine (TMED) and $Ba[Al(C_2H_5)_4]_2$, were introduced one after the other. The results are set in Table VI below:

TABLE VI

| Catalytic System | | | SBR Copolymers | | |
|---|---|---|---|---|---|
| Test No. | $Ba[Al(C_2H_5)_4]_2$ | TMED | Reaction Time | Intrinsic Viscosity | Steric Configuration |
| | | | | | % tr. 1,4 % 1,2 % Sty. Incorp. |
| 1 | 2440 | 1220 | 5 hr. 45 min. | 0.8 | 84 4 15 |
| 2 | 2440 | 2440 | 5 hr. | 1.5 | 81 4 16 |

EXAMPLE 7

Two liters of heptane, 205 g. of butadiene and 69 g. of styrene were introduced into a reactor under pressure of rectified nitrogen whereupon the temperature was increased to 80° C. and 4-methylpyridine or γ-picoline and Ba[Al(C$_2$H$_5$)$_4$]$_2$ were added one after the other. The results are set forth in Table VII below

TABLE VII

| Catalytic System | | Re-action Time | SBR Copolymers | | | |
|---|---|---|---|---|---|---|
| Ba[Al(C$_2$H$_5$)$_4$]$_2$ | γ-picoline | | Intrinsic Viscosity | Steric Configuration | | |
| | | | | % tr. 1,4 | % 1,2 | % Sty. Incorp. |
| 1100 | 1100 | 1 hr. 40 min. | 1.30 | 60 | 7 | 18 |

EXAMPLE 8

Two tests were carried out repeating the procedure of Example 3 using the catalytic system of Ba[Al(C$_2$H$_5$)$_4$]$_2$ and acetonitrile. The results are set forth in Table VIII below.

TABLE VIII

| | Catalytic System | | Reaction Time | Polybutadiene | | |
|---|---|---|---|---|---|---|
| Test No. | Ba[Al(C$_2$H$_5$)$_4$]$_2$ | Acetonitrile | | Intrinsic Viscosity | Steric Configuration | |
| | | | | | % tr. 1,4 | % 1,2 |
| 1 | 1100 | 74 | 3 hr. 45 min. | 1.6 | 77 | 3 |
| 2 | 1100 | 222 | 3 hr. 15 min. | 1.7 | 75 | 5 |

EXAMPLE 9

Three tests were carried out repeating the procedure of Example 3 and using similar conditions except that acetone and Ba[Al(C$_2$H$_5$)$_4$]$_2$ were used as the catalytic system. The results are set forth in Table IX below:

TABLE IX

| | Catalytic System | | Reaction Time | Polybutadiene | | |
|---|---|---|---|---|---|---|
| Test No. | Ba[Al(C$_2$H$_5$)$_4$]$_2$ | Acetone | | Intrinsic Viscosity | Steric Configuration | |
| | | | | | % tr. 1,4 | % 1,2 |
| 1 | 1100 | 74 | 7 hr. | 1.6 | 82 | 3 |
| 2 | 1100 | 222 | 6 hr. 30 min. | 1.8 | 78 | 3 |
| 3 | 1100 | 444 | 5 hr. 30 min. | 2.0 | 75 | 4 |

EXAMPLE 10

The procedure of Example 3 was repeated using similar conditions except that thiodiisobutyl and Ba[Al(C$_2$H$_5$)$_4$]$_2$ were used as the catalytic system. The results are set forth in Table X below.

TABLE X

| Catalytic System | | Reaction Time | Polybutadiene | | |
|---|---|---|---|---|---|
| Ba[Al(C$_2$H$_5$)$_4$]$_2$ | Thiodiisobutyl | | Intrinsic Viscosity | Steric Configuration | |
| | | | | % tr. 1,4 | 1,2 |
| 1100 | 222 | 22 hr. | 1.50 | 85 | 2 |

EXAMPLE 11

Three tests were carried out repeating the procedure of Example 3 and using similar conditions except that hexamethylphosphorotriamide (HMPT) and Ba[Al(C$_2$H$_5$)$_4$]$_2$ were used as the catalytic system. The results are set forth in Table XI below:

TABLE XI

| | Catalytic System | | Reaction Time | Polybutadiene | | |
|---|---|---|---|---|---|---|
| Test No. | Ba[Al(C$_2$H$_5$)$_4$]$_2$ | HMPT | | Intrinsic Viscosity | Steric Configuration | |
| | | | | | % tr. 1,4 | % 1,2 |
| 1 | 1100 | 222 | 3 hr. | 1.55 | 82 | 2 |
| 2 | 1100 | 444 | 2 hr 15 min. | 1.68 | 80 | 3 |
| 3 | 1100 | 888 | 2 hr. | 2.48 | 78 | 3 |

EXAMPLE 12

Two tests were carried out repeating the procedure of Example 3 and using similar conditions except that a catalytic system formed of Ba[Al(C$_2$H$_5$)$_3$OR]$_2$, OR being the nonylphenate radical, and lithium isopropylate were used. The results are set forth in Table XII below:

TABLE XII

| | Catalytic System | | Reaction Time | Polybutadiene | | |
|---|---|---|---|---|---|---|
| Test No. | Ba[Al(C$_2$H$_5$)$_3$OR]$_2$ | Lithium Isopropylate | | Intrinsic viscosity | Steric Configuration | |
| | | | | | % tr. 1,4 | % 1,2 |
| 1 | 1450 | 2900 | 18 hr. | 1.15 | 76 | 4 |
| 2 | 1450 | | 17 hr. | 1.33 | 78 | 4 |

Under the same conditions the use of Ba[Al(C$_2$H$_5$)$_3$OR]$_2$ by itself did not lead to any trace of polymer, even after 48 hours of reaction.

EXAMPLE 13

Two tests were carried out repeating the procedure of Example 3 and using similar conditions except that Li Al(C$_2$H$_5$)$_4$ and lithium isopropylate were used as the catalytic system. The results are set forth in Table XIII below:

TABLE XIII

| | Catalytic System | | Reaction Time | Polybutadiene | | |
|---|---|---|---|---|---|---|
| Test No. | Li Al(C$_2$H$_5$)$_4$ | Lithium Isopropylate | | Intrinsic Viscosity | Steric Configuration | |
| | | | | | % tr. 1,4 | % 1,2 |
| 1 | 1450 | 725 | 3 hr. 30 min. | 1.22 | 60 | 8 |
| 2 | 1450 | 1450 | 3 hr. 30 min. | 1.24 | 60 | 8 |

Under the same conditions, the use either of Li Al(C$_2$H$_5$)$_4$ alone or of lithium isopropylate alone did not lead to any trace of polymer even after 48 hours of reaction.

EXAMPLE 14

A test was carried out repeating the procedure of Example 3 and using Li Al(C$_2$H$_5$)$_4$, lithium isopropylate and barium nonylphenate as components of the catalytic system. The results are set forth in Table XIV below:

TABLE XIV

| Catalytic System | | | | Polybutadiene | |
|---|---|---|---|---|---|
| Li Al(C$_2$H$_5$)$_4$ | Barium Nonyl-phenate | Lithium Iso-propylate | Reaction Time | Intrinsic Viscosity | Steric Configuration |
| | | | | | % tr. 1,4   % 1,2 |
| 1450 | 725 | 2900 | 1 hr. 30 min. | 2.3 | 79    4 |

As compared with the preceding Example 13, the addition of the barium nonylphenate had the effect of orienting the microstructure.

EXAMPLE 15

A test was carried out repeating the procedure of Example 3 using a catalytic system consisting of Li Al(C$_2$H$_5$)$_4$, and sodium tert-amylate. The results are set forth in Table XV below:

TABLE XV

| Catalytic System | | Polybutadiene | | |
|---|---|---|---|---|
| Li Al(C$_2$H$_5$)$_4$ | Sodium Tert-amylate | Reaction Time | Intrinsic Viscosity | Steric Configuration |
| | | | | % tr. 1,4   % 1,2 |
| 1450 | 2900 | 14 hr. | 3.30 | 34    36 |

EXAMPLE 16

Two tests were carried out repeating the procedure of Example 3 except that a catalytic system formed of Na Al(C$_2$H$_5$)$_4$ and potassium tert-amylate (ROK) was used. The results are set forth in table XVI below:

TABLE XVI

| Catalytic System | | | Reaction Time | Polybutadiene | |
|---|---|---|---|---|---|
| Test No. | Na Al(C$_2$H$_5$)$_4$ | ROK | | Intrinsic Viscosity | Steric Configuration |
| | | | | | % tr. 1,4   % 1,2 |
| 1 | 1450 | 725 | 5 hr. | 3.12 | 37    38 |
| 2 | 1450 | 1450 | 5 hr. | 2.55 | 40    36 |

Under the same conditions the use of Na Al(C$_2$H$_5$)$_4$ by itself did not lead to any tract of polymer, even after 48 hours of reaction.

EXAMPLE 17

Two tests were carried out repeating the procedure of Example 3 except that a catalytic system formed of K Al(C$_2$H$_5$)$_4$ and potassium tert-amylate (ROK) was used. The results are set forth in Table XVII below:

TABLE XVII

| Catalytic System | | | Reaction Time | Polybutadiene | |
|---|---|---|---|---|---|
| Test No. | KAl(C$_2$H$_5$)$_4$ | ROK | | Intrinsic Viscosity | Steric Configuration |
| | | | | | % tr. 1,4   % 1,2 |
| 1 | 1450 | 360 | 4 hr. 30 min. | 1.37 | 50    26 |

Under the same conditions the use of KAl(C$_2$H$_5$)$_4$ by itself did not lead to any trace of polymer, even after 48 hours of reaction.

EXAMPLE 18

A test was carried out repeating the procedure of Example 3 using a catalytic system consisting of and barium nonylphenate.

The results are set forth in Table XVIII below:

TABLE XVIII

| Catalytic System | | Polybutadiene | | |
|---|---|---|---|---|
| Li Al(C$_2$H$_5$)$_3$O—CH(CH$_3$)$_2$ | Barium Nonyl-phenate | Reaction Time | Intrinsic Viscosity | Steric Configuration |
| | | | | % tr. 1,4   % 1,2 |
| 1450 | 725 | 10 hr. | 1.6 | 80    4 |

Under the same conditions, the use of by itself did not lead to any trace of polymer, even after 48 hours of reaction.

EXAMPLE 19

A test was carried out repeating the procedure of Example 3 employing a catalytic system consisting of LiOAl(C$_2$H$_5$)$_2$ and barium nonylphenate. The polymerization reaction was stopped when the conversion rate reached 60% instead of 80%. The results are set forth in Table XIX below.

TABLE XIX

| Catalytic System | | Polybutadiene | | |
|---|---|---|---|---|
| Li O Al(C$_2$H$_5$)$_2$ | Barium Nonyl-phenate | Reaction Time | Intrinsic Viscosity | Steric Configuration |
| | | | | % tr. 1,4   % 1,2 |
| 2960 | 740 | 5 hr. | 1.9 | 63    6 |

Under the same conditions the use of LiOAl(C$_2$H$_5$)$_2$ by itself did not lead to any trace of polymer, even after 48 hours of reaction.

EXAMPLE 20

Two tests were carried out repeating the procedure of Example 3 using a catalytic system consisting of Li[Al(C$_2$H$_5$)$_3$O Al(C$_2$H$_5$)$_2$] and lithium isopropylate. The results are set forth in Table XX below.

TABLE XX

| | Catalytic System | | | Polybutadiene | | |
|---|---|---|---|---|---|---|
| Test No. | Li[Al(C$_2$H$_5$)$_3$O Al(C$_2$H$_5$)$_2$] | Lithium Iso-propylate | Reaction Time | Intrinsic Viscosity | Steric Configuration | |
| | | | | | % tr. 1,4 | % 1,2 |
| 1 | 1100 | 370 | 5 hr. 30 min. | 1.78 | 58 | 9 |
| 2 | 1100 | 1100 | 5 hr. 30 min. | 1.95 | 59 | 9 |

Under the same conditions the use of Li[Al(C$_2$H$_5$)$_3$O Al(C$_2$H$_5$)$_2$] by itself did not lead to any trace of polymer, even after 48 hours of reaction.

EXAMPLE 21

Two tests were carried out repeating the procedure of Example 3 using a catalytic system consisting of Al(C$_2$H$_5$)$_3$, lithium isopropylate, and barium nonylphenate. The results are set forth in Table XXI below.

TABLE XXI

| | Catalytic system | | | Polybutadiene | | |
|---|---|---|---|---|---|---|
| Test No. | Al(C$_2$H$_5$)$_3$ | Lithium Iso-propylate | Barium Nonyl-phenate | Reaction Time | Intrinsic Viscosity | Steric Configuration |
| | | | | | % tr. 1,4 | % 1,2 |
| 1 | 2900 | 3600 | 360 | 5 hr. | 1.7 | 88 | 3 |
| 2 | 2900 | 3600 | 720 | 5 hr. | 1.35 | 85 | 3 |

Under the same conditions the use of Al(C$_2$H$_5$)$_3$ by itself did not lead to any trace of polymer, even after 48 hours of reaction.

EXAMPLE 22

A test was carried out repeating the procedure of Example 3 except that a catalytic system consisting of Li B(C$_2$H$_5$)$_3$C$_4$H$_9$ and barium nonylphenate was used. The results are set forth in Table XXII below:

TABLE XXII

| | Catalytic System | | | Polybutadiene | |
|---|---|---|---|---|---|
| Test No. | Li B(C$_2$H$_5$)$_3$C$_4$H$_9$ | Barium Nonyl-phenate | Re-action Time | Intrinsic Viscosity | Steric Config-uration |
| | | | | | % tr. 1,4 / % 1,2 |
| 1 | 5900 | 100 | 4 hr. | 1.6 | 83 / 3 |

Under the same conditions the use of Li B(C$_2$H$_5$)$_3$C$_4$H$_9$ by itself did not lead to any trace of polymer even after 48 hours of reaction.

EXAMPLE 23

A mixture of heptane, butadiene and styrene having a weight ratio of monomers to solvent of 1:5 and of butadiene to styrene of 3:1 was introduced continuously into a reactor. Ba[Al(C$_2$H$_5$)$_4$]$_2$ and lithium isopropylate were also introduced continuously in a molar ratio of 1:10 with such a speed that there was 960 μ mols of Ba[Al(C$_2$H$_5$)$_4$]$_2$ in the reactor for 100 g. of monomers and that there was an average time of stay in the reactor of 1½ hours. The copolymerization was effected at 90° C. and the reaction was stopped when the percentage conversion reached was 60% rather than 80%. The copolymer was recovered at the outlet of the reactor. It contained 16% styrene and had an intrinsic viscosity of 1.64, a trans-1,4 linkage content of 81% and a 1,2 linkage content of 3%.

EXAMPLE 24

Two liters of heptane, 191 g. of butadiene and 82 g. of styrene were introduced into a reactor under the pressure of rectified nitrogen and the temperature was increased to 80° C. There was then added in succession the catalytic system formed of 460 μ mols of Ba[Al(C$_2$H$_5$)$_4$]$_2$ per 100 g. of monomers and 1380 μ mols per 100 g. of monomers of lithium isopropylate. When the rate of conversion reached 80% (2 hours), 50 cc. of copolymer were recovered in customary manner and the reaction stopped by the addition of methanol. An amount of diphenyl carbonate (CDP) was then added to the reactor such that the ratio of CDP : Ba[Al(C$_2$H$_5$)$_4$]$_2$ was equal to 0.5:1.

The copolymer obtained was recovered by a conventional method. The microstructure of the copolymer obtained before grafting and of the grafted copolymer was: 81% trans-1,4 linkages, 4% of 1,2 linkages and 24% incorporated styrene.

The intrinsic viscosity of the ungrafted copolymer was 1.7 and that of the grafted copolymer was 2.6.

EXAMPLE 25

(1) Preparation of the Copolymer:

Two liters of heptane, 191 g. of butadiene and 82 g. of styrene were introduced into a reactor under the pressure of rectified nitrogen whereupon the temperature was increased to 80° C. The catalytic system formed of Ba[Al(C$_2$H$_5$)$_4$]$_2$ and lithium isopropylate was then gradually added. When a rate of conversion of 80% had been reached, the reaction was stopped and the copolymer recovered in customary manner. The elastomer obtained was then diluted with 37.5 parts of aromatic oil (Exarol MX 140, marketed by Compagnie Francaise de Raffinage) per 100 parts of dry elastomer. The results are set forth in Table XXV A.

TABLE XXV A

| Catalytic System | | | SBR Steric Configuration | | | | |
|---|---|---|---|---|---|---|---|
| Ba[Al(C$_2$H$_5$)$_4$]$_2$ | Lithium Isopropylate | Reaction Time | Intrinsic Viscosity | | % tr. 1,4 | % 1,2 | % Styr. Incorp. |
| | | | Before Dilution | After With the Oil | | | |
| 1000 | 7100 | 5 hr. 30 min. | 2.67 | 1.96 | 84 | 4 | 22 |

(2) Rubber Making Mix:

The elastomer described above was used to form a mixture having the following formula in parts by weight:

| | |
|---|---|
| 100 | Elastomer dilated with 37.5 parts of aromatic oil |
| 2 | Stearic acid |
| 3 | ZnO |
| 1 | Antioxidant (Santoflex 13: N-(dimethyl,3-butyl N'-phenyl-p-phenylene diamine) |
| 50 | HAF Black (Philblack O) |
| 5 | Aromatic oil (Sundex 8125, PM 380, density 0.995 marketed by Sun Oil) |
| 1 | Santocure (N-cyclohexyl-mercaptobenzothiazole sulfenamide |
| 1.8 | Sulfur |

The same mixture was prepared with a butadiene/styrene copolymer (SBR 1712) available on the market as a control. The two mixtures were then vulcanized for 60 minutes at 144° C.

The mechanical properties obtained are set forth in Table XXV B below:

TABLE XXV B

| Properties | Control (SBR 1712) | Test SBR |
|---|---|---|
| Modulus at 100% elongation (kg/cm$^2$) | 16 | 14.9 |
| Modulus at 300% elongation (kg/cm$^2$) | 67.5 | 58 |
| Hysteresis loss at 60° C. | 29 | 24.6 |
| Index of coefficient of friction at 20° C. (SRT) | 100 | 84 |
| Scott rupture index | | |
| elongation at rupture (%) | 570 | 540 |
| rupture force (kg/cm$^2$) | 231 | 222 |
| Shore A hardness | 62 | 60 |

SBR 1712 is a butadiene/styrene copolymer comprising 23.5% styrene, 15-16% of 1,2 linkages, 60% of trans-1,4 linkages and 37.5 parts of aromatic oil.

It was found that the elastomer in accordance with the invention has properties substantially equal to those of the above conventional copolymer. It can be used as the principal component of a mix for the manufacture of pneumatic tires.

EXAMPLE 26

This example relates to the preparation of butadiene/styrene copolymers; six tests were carried out.

The copolymerization was effected in a reactor in an inert atmosphere (rectified nitrogen) at 80° C. in the presence of heptane as solvent. The weight ratio of monomers to solvent was 1:5. The reaction was stopped when the rate of conversion reached 80%. The conditions of the tests and the results obtained are set forth in Table XXVI.

TABLE XXVI

| Catalytic System Ba [Al(C$_2$H$_5$)$_4$]$_2$ and C$_2$H$_5$(OCH$_2$CH$_2$)$_2$OLi | Test Nos. | | | | | |
|---|---|---|---|---|---|---|
| | 1 | 2 | 3 | 4 | 5 | 6 |
| Molar ratio Li/Ba | 1 | 1 | 1.5 | 1.5 | 2 | 2 |
| Initial styrene content (% by weight) | 24 | 32 | 24 | 32 | 24 | 32 |
| Quantity of Ba[Al(C$_2$H$_5$)$_4$]$_2$ | 730 | 600 | 910 | 750 | 400 | 1300 |
| Reaction time (in minutes) | 140 | 200 | 190 | 270 | 270 | 330 |
| Copolymers | | | | | | |
| Intrinsic Viscosity | 2.17 | 2.08 | 1.86 | 2.09 | 2.1 | 1.90 |
| Content of trans-1,4(%) | 85 | 85 | 87 | 87 | 90 | 90 |
| Content of 1,2(%) | 3 | 3 | 3 | 3 | 3 | 3 |
| Content of incorporated styrene (% by weight) | 15 | 23 | 15 | 23 | 15 | 23 |

On test pieces of the copolymer of Test 5 and of natural rubber (NR) filled in accordance with the formulation of Example 25 but not vulcanized, force-elongation measurements (measurement of the green strength) were carried out at 25° C. The force elongation measurements were carried out on "dumbbell" test specimens of a thickness of 2.5 mm. and effected with the use of an "Instron" electronic dynamometer 24 hours after molding and with a rate of traction of 10 cm./minute. The results obtained are set forth in the graph of the drawing, the ordinate of which represents the force exerted in g./mm$^2$ and the abscissa represents the elongation (in %). It was found that the copolymer prepared by the improved method of the invention had a resistance to elongation similar to that of natural rubber.

EXAMPLE 27

A mixture of toluene, butadiene and styrene in proportions such that the weight ratio of monomers to solvent was equal to 1:5 and the ratio of butadiene to styrene was equal to 3:1 was introduced continuously into a reactor. Ba[Al(C$_2$H$_5$)$_4$]$_2$ and C$_2$H$_5$(OCH$_2$CH$_2$)$_2$OLi were also introduced continuously in quantities such that their molar ratio was 1:2. The rate of flow was such that there were 1000 micromols of Ba[Al(C$_2$H$_5$)$_4$]$_2$ in the reactor per 100 g. of monomers and that an average time of stay in the reactor of 1 hour was obtained. The copolymerization was effected at 90° C. and the reaction was stopped when the percentage conversion reached was 65% rather than 80%. The copolymer formed was recovered continuously at the outlet of the reactor. It contained 15% by weight of styrene and had an intrinsic viscosity of 1.6. The content of 1,2 linkages was 3% and that of trans-1,4 linkages was 83%.

EXAMPLE 28

The catalytic system of Ba[Al(C$_2$H$_5$)$_4$]$_2$ and (C$_2$H$_5$)$_2$NCH$_2$cH$_2$OLi was used. 100 ml. of heptane as solvent and 13.6 g. of butadiene were introduced into a 250 ml. Steinie bottle under the pressure of rectified nitrogen. The catalytic system was then added whereupon the bottle was placed in a tank which was thermostatically controlled at 80° C., in which it was agitated.

At the end of the reaction, when the percent of conversion reached 80%, the polybutadiene formed was recovered by an ordinary method. The results are set forth in Table XXVIII.

TABLE XXVIII

| Catalytic System | | | Reaction Time (in min.) | Polybutadiene | | |
|---|---|---|---|---|---|---|
| Test No. | Ba[Al (C$_2$H$_5$)$_4$]$_2$ | (C$_2$H$_5$)$_2$ NCH$_2$ CH$_2$OLi | | Intrinsic Viscosity | % tr. 1,4 | % 1,2 |
| 1 | 100 | 200 | 60 | 1.75 | 85 | 4 |

EXAMPLE 29

A test was carried out repeating the procedure of Example 28 and using similar conditions except that a catalytic system formed of Ba[Al(C$_2$H$_5$)$_4$]$_2$ and C$_2$H$_5$(OCH$_2$CH$_2$)$_2$ONa was used. The results are set forth in Table XXIX below:

TABLE XXIX

| Catalytic System | | Reaction Time | Polybutadiene | | |
|---|---|---|---|---|---|
| Test No. | Ba[Al(C$_2$H$_5$)$_4$]$_2$ | C$_2$H$_5$(OCH$_2$CH$_2$)$_2$ONa | | Intrinsic Viscosity | % tr. 1,4 | % 1,2 |
| 1 | 100 | 100 | 3 hr. | 5 | 88 | 3 |

EXAMPLE 30

A test was carried out repeating the procedure of Example 29 and using similar conditions except that a catalytic system formed of Ba[Al(C$_2$H$_5$)$_4$]$_2$ and C$_2$H$_5$(OCH$_2$CH$_2$)$_3$OLi was employed. The results are set forth in Table XXX below:

TABLE XXX

| Catalytic System | | Reaction Time (in min.) | Polybutadiene | | |
|---|---|---|---|---|---|
| Test No. | Ba[Al(C$_2$H$_5$)$_4$]$_2$ | C$_2$H$_5$(OCH$_2$CH$_2$)$_3$OLi | | Intrinsic Viscosity | % tr. 1,4 | % 1,2 |
| 1 | 100 | 100 | 60 | 2.8 | 80 | 4 |

EXAMPLE 31

A test was carried out repeating the procedure of Example 3 using a catalytic system consisting of LiAl(C$_2$H$_5$)$_4$ and barium nonylphenate. The results are set forth in Table XXXI below:

TABLE XXXI

| Catalytic System | | Reaction Time | Polybutadiene | |
|---|---|---|---|---|
| Test No. | LiAl(C$_2$H$_5$)$_4$ | Barium Nonyl-phenate | | Intrinsic Viscosity | Steric Configuration |
| 1 | 1450 | 725 | 3 hr. 30 min. | 1.88 | % tr. 1,4 70 / % 1,2 5 |

EXAMPLE 32

Three tests were conducted, the reaction being carried out in a 250 ml. Steinie bottle under pressure of rectified nitrogen. There were introduced 100 ml. of heptane as solvent and 4.08g. of styrene followed by 9.68g. of butadiene. The catalytic system formed of Ba[Al(C$_2$H$_5$)$_4$]$_2$ and barium nonylphenate was then introduced. The bottle was placed in a thermostatically controlled tank at 80° C. in which it was agitated.

At the end of the reaction, the SBR copolymers were recovered in ordinary manner. The results are set forth in Table XXXII below:

TABLE XXXII

| Catalytic System | | Reaction Time | SBR Copolymers | | | |
|---|---|---|---|---|---|---|
| Test No. | Ba[Al(C$_2$H$_5$)$_4$]$_2$ | Barium Nonyl-phenate | | Intrinsic Viscosity | % tr. 1,4 | % 1,2 | % Sty Incorp |
| 1 | 735 | 73 | 6 hr. | 1.8 | 57 | 5 | 20 |
| 2 | 735 | 157 | 4 hr. | 1.7 | 61 | 5 | 23 |
| 3 | 735 | 367 | 3 hr. | 1.75 | 70 | 4 | 22 |

EXAMPLE 33

A test was carried out repeating the procedure of Example 3 using a catalytic system consisting of Al(C$_2$H$_5$)$_3$ and lithium isopropylate. The results are set forth in Table XXXIII below:

TABLE XXXIII

| Catalytic System | | Reaction Time | Polybutadiene | |
|---|---|---|---|---|
| Test No. | Al(C$_2$H$_5$)$_3$ | Lithium Iso-propylate | | Intrinsic Viscosity | Steric Configuration |
| 1 | 2200 | 3200 | 15 hr. | 1.09 | % tr. 1,4 59 / % 1,2 7 |

EXAMPLE 34

A test was carried out repeating the procedure of Example 3 using a catalytic system consisting of Al(C$_2$H$_5$)$_3$ and (C$_2$H$_5$OCH$_2$CH$_2$O)$_2$Ba, i.e., barium ethylglycolate. The results are set forth in Table XXXIV below.

TABLE XXXIV

| Catalytic System | | Reaction Time | Polybutadiene | |
|---|---|---|---|---|
| Test No. | Al(C$_2$H$_5$)$_3$ | (C$_2$H$_5$OCH$_2$CH$_2$O)$_2$Ba | | Intrinsic Viscosity | Steric Configuration |
| 1 | 2950 | 2950 | 10 hr. | 1.3 | % tr. 1,4 60 / % 1,2 6 |

EXAMPLE 35

A test was carried out repeating the procedure of Example 3 using a catalytic system consisting of NaOAl(C$_2$H$_5$)$_2$ and lithium isopropylate. The results are set forth in Table XXXV below.

TABLE XXXV

| Catalytic System | | Reaction Time | Polybutadiene | |
|---|---|---|---|---|
| Test No. | NaOAl(C$_2$H$_5$)$_2$ | Lithium Isopropylate | | Intrinsic Viscosity | Steric Configuration |
| 1 | 1100 | 3300 | 6 hr. | 1.5 | % tr. 1,4 42 / % 1,2 26 |

What is claimed is:

1. A process of producing homopolymers of conjugated dienes or copolymers of conjugated dienes with other conjugated dienes or with vinyl aromatic compounds to form elastomeric products which comprises reacting the monomers at a temperature between 50° C. and 120° C. in the presence of a catalytic system formed of the reaction product of
   (a) an organometallic compound of a metal of Group IIIA of the Mendeleev periodic table of elements having the following formula: Me$^2$(Me$^3$R$^1$R$^2$R$^3$R$^4$)$_2$ in which Me$^2$ represents an alkaline earth metal, Me$^3$ represents aluminum or boron, R$^1$, R$^2$, and R$^3$ represent an alkyl or aralkyl radical and R$^4$ represents an alkyl or aralkyl radical or a radical XB in which X represents an oxygen, sulfur or nitrogen atom and B represents an alkyl or aralkyl radical; with
   (b) at least one electron-donor compound containing at least one hetero-atom and formed of the reaction product of a protic polar compound with an alkali metal or with an alkaline earth metal.

2. The process according to claim 1 wherein the reaction is conducted in an inert hydrocarbon solvent reaction medium.

3. The process according to claim 1 wherein the electron-donor compound is selected from the group consisting of compounds formed of the reaction product of alcohols, thiols, phenols, primary or secondary amines with an alkali metal or with an alkaline earth metal; and compounds having one of the following formulas:

$R(OCH_2CH_2)_n O\ Me^1$ or $(R)_2NCH_2CH_2O\ Me^1$ in which $Me^1$ represents an alkali metal, R represents an alkyl radical and n is a whole number.

4. The process according to claim 1 wherein the electron-donor compound is selected from the group consisting of lithium isopropylate, barium nonylphenate, the lithium alcoholate of ethyl diglycol, and lithium N,N-diethylamino-2-ethanolate.

5. The process according to claim 1 wherein the molar ratio of the electron-donor compound to the organometallic compound of a metal of Group IIIA is between 0.01:1 and 100:1.

6. The process according to claim 1 wherein the organometallic compound of a metal of Group IIIA is a compound selected from the group consisting of: $Ba[Al(C_2H_5)_4]_2$, $Ba[Al(i-C_4H_9)_4]_2$, $Sr[Al(C_2H_5)_4]_2$ and $Ca[Al(C_2H_5)_4]_2$.

7. The process according to claim 1 wherein the catalytic system is formed of the reaction product of (a) $Ba[Al(C_2H_5)_4]_2$ with (b) an electron-donor compound containing at least one hetero-atom selected from the group consisting of lithium isopropylate, the lithium alcoholate of ethyl diglycol and lithium N,N-diethylamino-2-ethanolate.

8. The process according to claim 1 wherein the conjugated diene is butadiene and the vinyl aromatic compound is styrene.

9. Homopolymers and copolymers prepared by the process according to claim 1.

10. Articles of rubber manufactured by means of the homopolymers or copolymers according to claim 9.

* * * * *

UNITED STATES PATENT AND TRADEMARK OFFICE
CERTIFICATE OF CORRECTION

PATENT NO. : 4,112,210
DATED : Sept. 5, 1978
INVENTOR(S) : Yves de Zarauz

It is certified that error appears in the above-identified patent and that said Letters Patent are hereby corrected as shown below:

Col. 3, line 1 and lines 14 and 15, "organometalic" should read --organometallic--. Col. 4, line 34, "In" should be --in--. Col. 7, lines 65 and 66, "1,2" should read $\frac{\%}{1,2}$. Col. 8, line 35, "1450    17 hr.    1.33    78    4" should read --1450    5800    17 hr. 1.33    78    4--.

Col. 8, line 49, delete "Intrin-". Col. 10, Table XVIII, "Reaction Time" should be a separate heading and not a subheading under "Polybutadiene". Col. 13, line 5, "dilated" should read --diluted--. Col. 14, line 42, "NCH$_2$cH$_2$" should read --NCH$_2$CH$_2$--; and Col. 14, Table XXVIII, "CH$_2$OLi" should be moved from the fourth column to follow "NCH$_2$" in the third column.

*Signed and Sealed this*

*Twenty-second* Day of *May 1979*

[SEAL]

Attest:

RUTH C. MASON
*Attesting Officer*

DONALD W. BANNER
*Commissioner of Patents and Trademarks*